United States Patent
Truong et al.

(10) Patent No.: US 7,742,608 B2
(45) Date of Patent: Jun. 22, 2010

(54) FEEDBACK ELIMINATION METHOD AND APPARATUS

(75) Inventors: Kwan Kin Truong, Lilburn, GA (US); James Steven Joiner, Avondale Estates, GA (US)

(73) Assignee: Polycom, Inc., Pleasanton, CA (US)

( * ) Notice: Subject to any disclaimer, the term of this patent is extended or adjusted under 35 U.S.C. 154(b) by 1483 days.

(21) Appl. No.: 11/095,045

(22) Filed: Mar. 31, 2005

(65) Prior Publication Data

US 2006/0227978 A1    Oct. 12, 2006

(51) Int. Cl.
*H04R 15/00* (2006.01)

(52) U.S. Cl. .............................. 381/93; 381/66; 381/83; 381/96; 381/94.1; 381/94.2; 381/94.3; 379/406.01; 379/406.12

(58) Field of Classification Search .................... 381/66, 381/83, 93, 94.1–94.3, 94.7, 71.14, 86, 96; 379/406.01–406.14
See application file for complete search history.

(56) References Cited

U.S. PATENT DOCUMENTS

| | | | |
|---|---|---|---|
| 5,263,019 A | 11/1993 | Chu | 370/32.1 |
| 7,133,529 B2 * | 11/2006 | Ura | 381/66 |
| 7,187,778 B2 * | 3/2007 | Basseas | 381/314 |
| 7,190,800 B2 * | 3/2007 | Terada et al. | 381/93 |
| 2003/0210797 A1 * | 11/2003 | Kreifeldt et al. | 381/93 |

* cited by examiner

*Primary Examiner*—Xu Mei
*Assistant Examiner*—Disler Paul
(74) *Attorney, Agent, or Firm*—Wong, Cabello, Lutsch, Rutherford & Brucculeri LLP (57) ABSTRACT

A method and apparatus for detecting a singing frequency in a signal processing system using two neural-networks is disclosed. The first one (a hit neural network) monitors the maximum spectral peak FFT bin as it changes with time. The second one (change neural network) monitors the monotonic increasing behavior. The inputs to the neural-networks are the maximum spectral magnitude bin and its rate of change in time. The output is an indication whether howling is likely to occur and the corresponding singing frequency. Once the singing frequency is identified, it can be suppressed using any one of many available techniques such as notch filters. Several improvements of the base method or apparatus are also disclosed, where additional neural networks are used to detect more than one singing frequency.

93 Claims, 3 Drawing Sheets

FEEDBACK ELIMINATION METHOD AND APPARATUS

CROSS-REFERENCE TO RELATED APPLICATIONS

None.

BACKGROUND OF THE INVENTION

1. Field of the Invention

This invention relates to signal processing, more specifically to audio feedback detection and elimination.

2. Description of the Related Art

Figure 1:
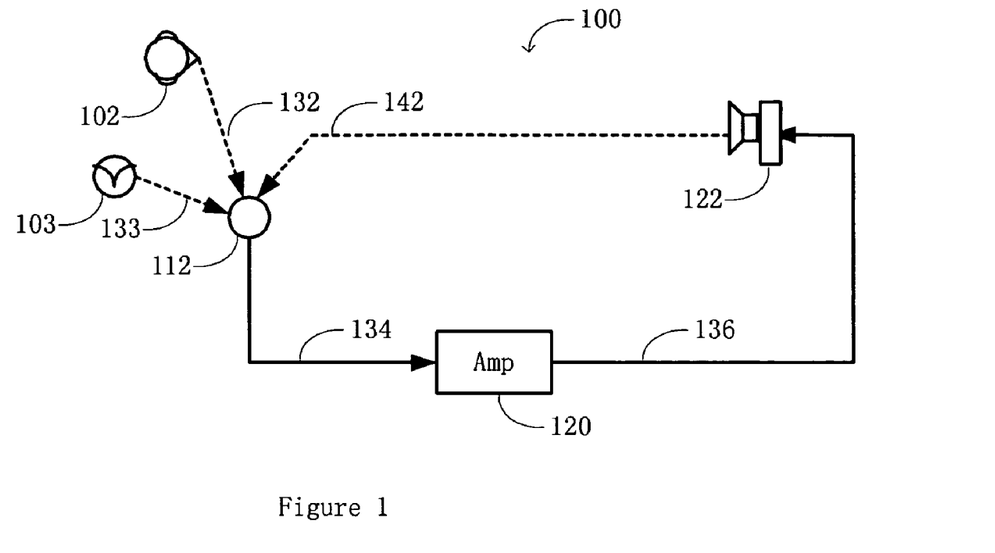
FIG. 1 shows a basic audio system.
Figure 2:
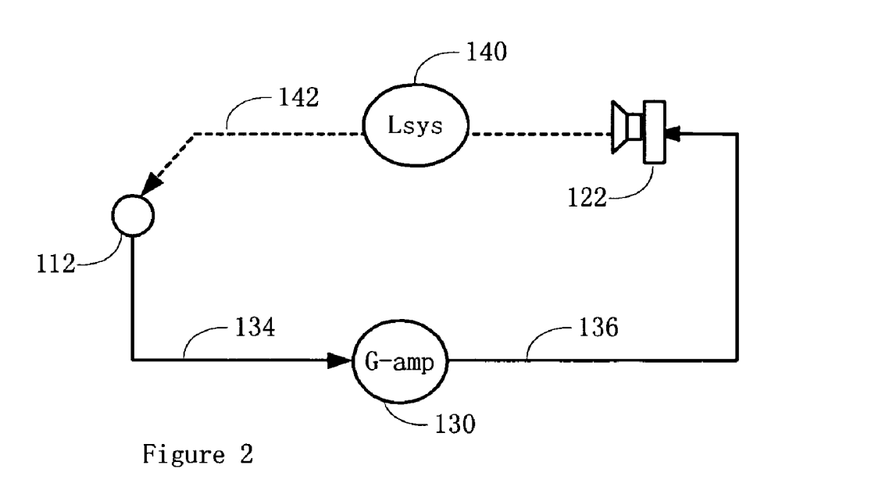
FIG. 2 depicts an electro-acoustic model of the closed-loop system shown in FIG. 1.

Audio feedback is a common problem in many audio amplification systems, where there is an acoustic coupling between a loudspeaker and a microphone within the same audio system. When the audio feedback is out of control or howling, the loudspeaker makes a very loud sound. This loud, highly annoying squeaking sound heard in an audio system due to a large portion of the audio being re-amplified back to the system with a gain exceeding the stability margin is often referred to as "howling." FIG. 1 is a block diagram of an audio system 100 illustrating the different components that affect the acoustic feedback problem. The audio system 100 is to amplify the speech by a talker 102. The microphone 112 picks up the speech 132 and generates speech signal 134. The speech signal 134 is strengthened by an amplifier 120 and becomes signal 136 which drives a loudspeaker 122 to produce sound. But in addition of picking up the speech signal 132, the microphone 112 also picks up sound signal 142 from the loudspeaker 122 and noises 133 from many sources, such as an air vent 103. The signal due to sound 142 mixed into the signal 134 can make a closed loop, as shown in FIG. 2. The closed loop can cause the feed back problem. FIG. 2 illustrates the system loss and gain for a closed loop for a particular frequency for the audio system 100 of FIG. 1. The room response affects how the sound is being acoustically reflected and directed, depending on the room design and the materials used, and the speaker-microphone placements. Such response, mainly signal loss, may be represented by system loss (L-sys) 140. The system amplifier 120, among other things, increases the amplitude of the signal. It can be represented by the amplifier gain (G-amp) 140. For each frequency, when the overall system gain (L-sys+G-amp) of the closed loop is below a threshold, the audio system is stable. When the overall system gain is above the threshold or theoretical limit, the system becomes unstable and howling occurs.

The audio system response consists of the electro-acoustic components of the loudspeaker 122 and the microphone 112, and the Digital Signal Processing (DSP)/Amplification etc. of the audio system. The direct path response depends on the distance of the talker 102 relative to the microphone 112 and is typically also related to the design of the room. Examples of such systems include many large conference rooms with single or multi-zone sound reinforcement, Public Address (PA) systems, and live musical performances. Howling also occurs quite frequently in conference rooms even without sound reinforcement if the room is equipped to provide highly full-duplex conferencing. In this case, the acoustic coupling is the same, but the audio system response typically incurs some additional delays, and some nonlinear DSP processing such as echo suppression and noise cancellation.

Acoustic feedback (howling) in any audio amplification system can cause many problems. "Howling" can disrupt a lecture, irritate audience, and can even damage equipment and people's hearing. Howling typically occurs in a particular frequency where the overall system gain is above the threshold. It is found that the howling condition may vary depending on the overall environment, such as the positions of microphones, loudspeakers, the position and/or movement of the talker, the loudness of his voice, the room arrangement etc. The changing nature of howling makes it difficult to deal with.

There are various methods in the prior art attempting to eliminate the acoustic feedback or at least reduce its detrimental effect. For example, US patent application publication US2003/0210797 and its commercial embodiment dbx Advanced Feedback Suppression discloses a method. It uses Fast Fourier Transformation (FFT) to identify the frequency with the largest energy and uses polynomial interpolation to pin point the frequency if it is between the FFT bins. The frequency with the largest energy is treated as the singing frequency. Once a singing frequency is detected, the singing frequency is suppressed using notch filters. Thus the howling can be eliminated.

But most prior art methods do not provide a way to predict the occurrence of howling, i.e. predict the occurrence of howling before it actually occurs. The frequency with the largest energy in the audio spectrum is not necessarily a singing frequency. It may just be a tone that has a large energy. Prior art methods that suppress all frequencies with large energy can degrade the audio system performance even if the suppressed frequency is narrowly tailored and targeted. In many cases, random noise resonates at one or more frequency locations in the loop response. In such a case the detection is more difficult because each frequency may not always increase monotonically with time due to the non-stationary nature of the noise. An even more difficult case is when the system resonates around the peaks of the human speech spectrum (this occurs if someone talks into a microphone in an extremely high loop-gain system). The difficulty in this case lies in the discrimination between normal (but very loud speech) and speech that is about to cause howling.

Another constraint that further degrades howling detection performance is the inadequate FFT frequency resolution, which can jitter the maximum spectral energy bin to its neighboring bin. Furthermore, a detector must catch the singing frequency before the signal is clipped in the analog domain or by the A-to-D and D-to-A converters because such nonlinearity can severely corrupt the frequency analysis of the howling detector. Thus detection must occur before the signal is clipped and should be as early as possible if one wishes to eliminate the annoying squeaky loud howling tones completely.

It is desirable to have a method or apparatus to detect or predict when a howling is about to occur before it actually occurs. It is desirable to accurately predict such occurrence without too many false alarms which may degrade the overall audio system performance. A failure to properly predict necessarily means you will get the howling tone.

BRIEF SUMMARY OF THE INVENTION

In developing the current invention, it was found that the behavior and development of an acoustic feedback is very similar to a learning process of a neuron in a neural-network. A strong resonating frequency (neuron or node) gets stronger and suppresses its weaker neighbors. The strongest frequency (node) eventually becomes a "singing" frequency which causes the "howling." The present invention uses a neural-network to simulate the process. The neural-network can monitor and quickly predict the "singing" frequency without affecting the audio system until a decision is made to suppress the "singing" frequency in the system at the right moment. A howling detector contains at least two neural networks, one for a hit histogram and one for a rate of change histogram. The hit histogram tracks the frequency having the maximum energy. The rate of change histogram tracks the changes in the maximum energy with time. An increase in the maximum energy may predict the occurrence of "howling." When the hit histogram (the maximum energy) and the change histogram (the rate of increase of the maximum energy) reach their thresholds and criteria, the "howling" is detected. An improved howling detector may contain an additional third energy network for tracking the maximum energy and adjusting the detection threshold for the other two neural networks. Such adjustment can improve the accuracy of the prediction.

The detector may be further improved for some applications. In an audio system where a tonal signal due to a tone or noise is present, a second "howling" detector with two or three neural-networks may be installed to detect a "singing frequency" at an earlier developing stage.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Figure 3:
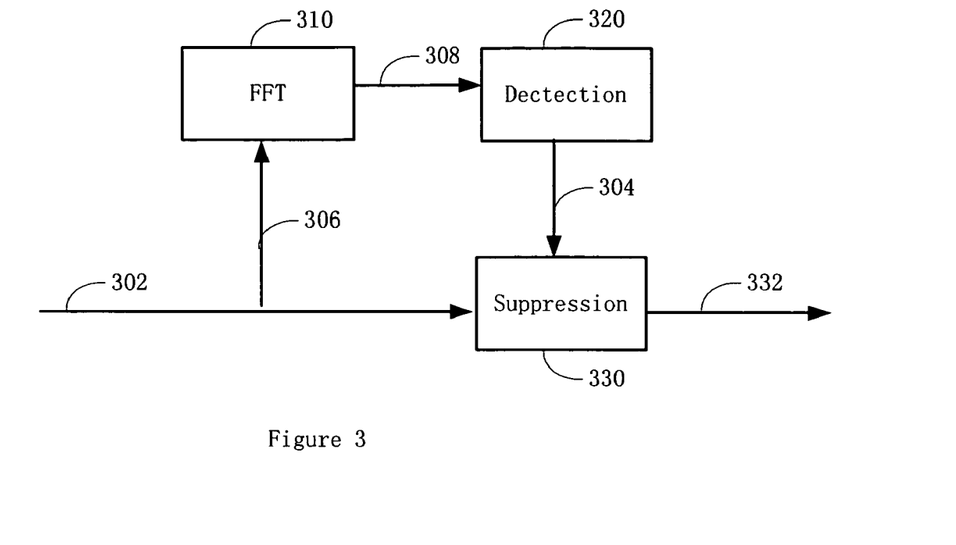
FIG. 3 shows a logic block diagram of the current invention.

FIG. 3 illustrates a signal block diagram of the current invention. An audio signal input 302 feeds into an audio system. The signal 302 goes into suppression module 330. If there is no howling, then the signal goes out of suppression module 330 as signal 332 without any changes. Besides this signal path, there is a side-path, from side signal 306 to FFT module 310, frequency signals 308, detection module 320, output signals 304 and finally goes into suppression module 330. For each input audio signal frame 306, the FFT module converts it into a set of frequency signals 308 in the frequency domain. The detection module 320 processes the frequency signals 308 according to the methods discussed in more detail below. If there is no "howling" detected according to the detection module 320, then a "no howling" state is sent to the suppression module 330, which takes no action. If there is "howling," where the singing frequency is identified, then a "howling" state along with the singing frequency are passed to the suppression module 330 through signal path 304. The singing frequency in the audio signal 302 is suppressed in the suppression module 330. Any prior art techniques for suppressing an identified frequency can be used with the present invention. As shown in FIG. 3, the howling detection process is separate from other audio signal processing of the audio system, i.e. the detection is non-intrusive, and does not add any delay to the audio system.

Before "howling" occurs at a singing frequency, the energy of that frequency typically increases with time. It is reinforced by the audio system in the closed loop each time it passes through the system amplifier, as illustrated in FIG. 2. Once the energy exceeds the capacity of the audio system, "howling" occurs. The energy of a frequency increasing in time is referred to as "singing." The frequency is the singing frequency. When the singing energy continues to increase and passes a threshold, it runs away and produces "howling". The howling detectors of the current invention detects such a singing frequency which will cause "howling" before the "howling" actually occurs. The suppression module then can suppress the frequency, and prevent the occurrence of "howling."

In developing the current invention, numerous experimental studies were performed. It was found that as the feedback builds up the number of frequencies resonating generally decreases with time but the remaining resonating frequencies increase in energy. This process of starting with many resonating frequencies and then merging into fewer stronger ones and eventually into a single strongest frequency is a process very similar to that of a competitive learning neural-net algorithm. Since the development of "howling" resembles the behavior of a learning process of a node in a neural network, the current invention utilizes neural networks. Neural network computing is a form of adaptive signal processing technique which emulates the decision making process of the human brain. The key components in a neural net consist of a non-linear function in each simple processing node and a massive feedback loop interconnecting all the nodes. A neural network is essentially a series or set of data points (nodes). Each new data point is related the earlier data points and an external stimulus. The new data point is generated based on a non-linear function (a rule) and those data.

In the neural-net algorithm the node with the strongest activity suppresses the weaker ones, which in turn suppress the even weaker ones. The process continues until a single node converges with the strongest activity. This is known as the 'winner-takes-all' process.

In the current invention, one or more neural networks may be used. Each node represents a spectral energy bin computed via Fast-Fourier Transform (FFT) from an audio frame. After data (energy for each bin for each audio frame) from a sufficient number of frames are collected, such data are provided to the neural networks. The neural networks perform the learning process and analyze the status of each node. The neural net output is a set of estimated probabilities of each frequency bin indicating the likelihood of singing. The neural network then can make a decision whether "howling" will occur. If "howling" will occur, neural network reports the frequency to a howling suppression module in the audio system, e.g. the suppression module 330 in FIG. 3. The suppression module can eliminate the singing frequency before the howling actually occurs. If not, then the neural network requests more data and continues monitoring the audio system. The neural nets continuously monitor the maximum spectral peak as it changes in time and the rate of increase in energy of that frequency bin over time.

In a preferred embodiment, two neural networks are maintained in the detector, e.g. in detector 320 shown in FIG. 3. The first neural network is a hit neural network which is used to emulate the strengthening of the maximum energy bin and weaken all other bins. The second neural network is a change neural network, which is used to emulate the continuous increase in energy of the maximum energy bin. Both the hit neural network and the change neural network are cumulative, such that a couple of errors in the FFT transformation or data acquisition of either network do not affect the final cumulative result. When the bins with maximum energies are narrowed down to a single bin, where its energy is above a hit threshold, and the rate of increase of its energy is also above a change threshold, then a "howling" frequency is identified.

To make the detector more robust and more accurate for more applications, more neural networks may added to the detector, each emulate a different process.

These neural-nets improve the detection process in many ways. They escalate the howling process on the monitoring data set so that detection can be achieved sooner. The monitoring data set is separate from the actual audio data and has no affect on the actual data during the detection, so they do not degrade the audio system performance. They can detect a singing frequency that is near the boundary of the FFT bins which effectively suppresses the spectral noise due to the limited FFT resolution.

To simplify the description, the algorithm terms and notations are defined in Table 1.

TABLE 1

Notations and terminologies for the neural net howling detector

| | |
|---|---|
| $n = \{0, 1, \ldots I_t \ldots 2I_t \ldots 3I_t\}$ | Frame index where each frame contains a number of audio samples. The neural nets are being tested after each $I_t$ frames. $I_t$ is 5 in the example discussed below. |
| $I_{total}$ | The total number of possible hits which any node in a neural net can have; For example, if the same node is selected as the maximum for all the frames, than the number of hits of this node would be $I_{total}$. |
| $I_t$ | The frame interval under which all neural nets are undergoing testing for possible acoustic singing; It is known as the "singing test interval" $I_t$ is typically a fraction of $I_{total}$ but can be the same as $I_{total}$. In the example, $I_{total}$ is 30, which is six times of $I_t$. |
| $X[n] = \{x_0[n], x_1[n], \ldots, x_{M-1}[n]\}$ | Spectral energy bins of the $n^{th}$ audio frame. Each component $x_i[n]$ is the $i^{th}$ bin of the spectral energy corresponding to spectral content of the audio frame at a particular frequency. There are a total of M spectral bins covering the whole spectrum of the audio frame |
| $x_{max}[n]$ | The spectral bin with the maximum energy among all the spectral bins in time frame index n. It is defined as $$x_{max}[n] = \max_{0 \leq i < M-1}\{x_i[n]\},$$ where M is the total number of bins covering the full spectrum of the audio frame. |
| $G[n] = \{g_0[n], g_1[n], \ldots, g_{M-1}[n]\}$ | Energy neural network. The neural net containing the maximum energy of all the spectral bins. Each $g_i[n]$ is a node of the neural net, and there are a total of M nodes for M spectral energy bins |
| $F[n] = \{f_0[n], f_1[n], \ldots, f_{M-1}[n]\}$ | Hit neural network. The neural net containing the histogram of $x_{max}[n]$ at frame n. There are M nodes for M histograms. |
| $R[n] = \{r_0[n], r_1[n], \ldots, r_{M-1}[n]\}$ | Change neural network. The neural net containing the histogram of the positive rate of change of $x_{max}[n]$ with respect to future frames. That is, $r_i[n]$ is the histogram of $x_{max}[n]$ only if $x_{i_m}[n] > \alpha[n]x_{i_m}[n-1]$ for $I_t > 0$ and $\alpha[n] > 0$. |

Figure 4:
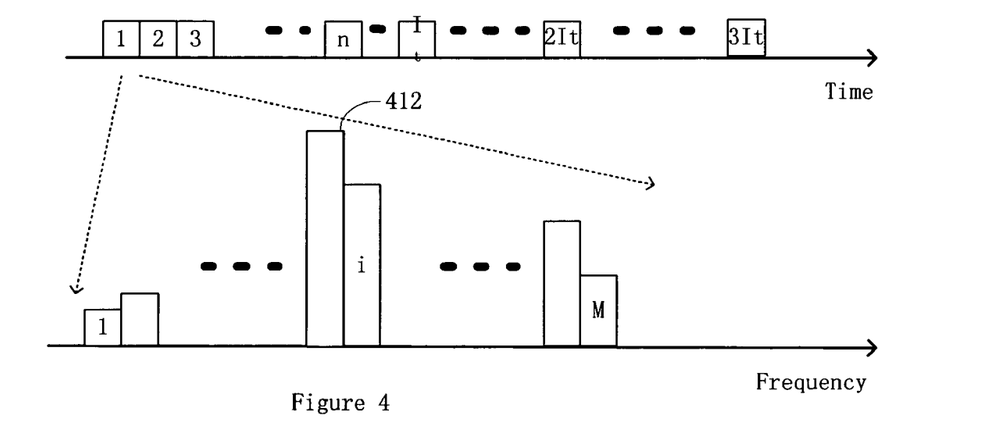
FIG. 4 illustrates the audio signal sampling in the time domain, and an FFT in frequency domain for one frame of audio signal samples (data frame).

As illustrated in FIG. 4, the audio signal is sampled continuously at a sampling frequency. Every signal frame contains a fixed number of samples. Typically, the howling detector is working on $I_t$ frames in one detection cycle. Each signal frame is converted from the time domain into the frequency domain, as shown in FIG. 4. For each signal frame, there are M frequency bins to represent the whole frequency spectrum of the signal frame. The strength of each frequency bin represents the energy of that frequency within the spectrum for that signal frame. For example, the bin that has the strongest strength is the bin 412 as shown in FIG. 4.

Figure 5:
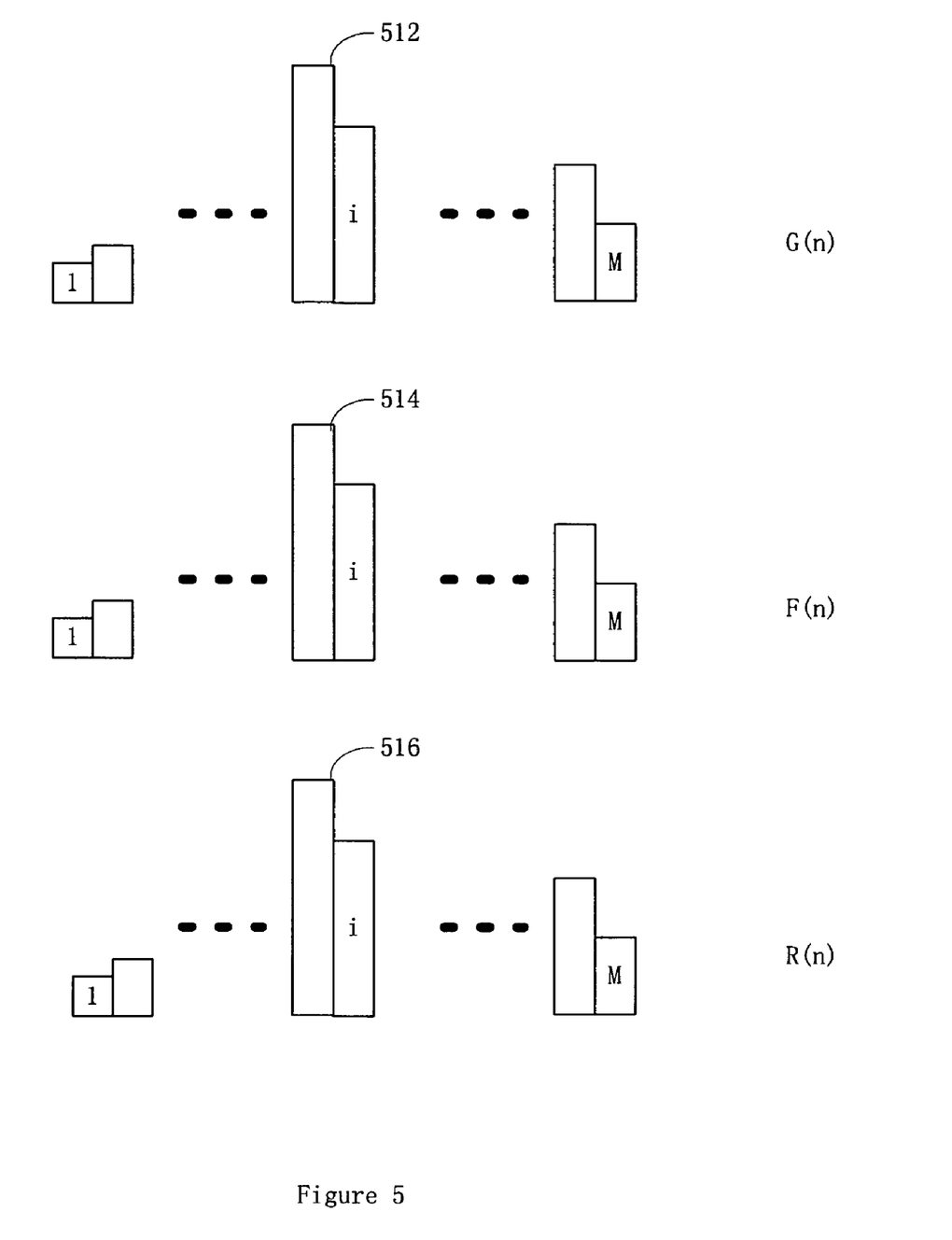
FIG. 5 illustrates the three neural-networks in a "howling" detector according to the current invention, an energy network, a hit network and a change network.

FIG. 5 illustrates three sets of data points, or three neural networks G[n] 512, F[n] 514 and R[n] 516, each having M data points (nodes). Each node corresponds to a frequency bin of the signal frame, as shown in FIG. 4. Each node in the three networks is updated once per signal frame according to the frequency bin in each signal frame as discussed in more detail below.

To simplify the discussion below, one embodiment of the current invention is discussed in more detail. In this embodiment, each signal frame contains 256 audio samples with a sampling frequency of 48,000 Hz. Thus, each audio frame is 256*(1/48000)=5.333 milliseconds (msec) in duration. All the audio samples are normalized to a signal range between [−1, +1]. The bandwidth of the audio is assumed to be 24,000 Hz and there are 256 bins since the number of frequency bins is half the size of the number of audio samples. Thus each frequency bin covers $$\frac{24,000}{256} = 93.75 Hz$$

of the audio spectrum from 0 to 24,000 Hz. In one example, the total number of frames tracked $I_{total}$ is 30 frames while the howling condition is checked every 5 frames ($I_t$). So howling can be detected as fast as 5*5.333=26.66 msec, and is typically less than 30*5.333=160 msec.

Single (or Single Stage) Detector:

For each frame, the samples are transformed using the FFT with 50 percent overlap. The output from the FFT is the short-time complex frequency spectrum of the corresponding audio frame. The spectral energy bins are computed as the square magnitude of each complex spectrum bin. These energy bins denoted as $X[n]=\{x_0[n], x_1[n], \ldots, x_{M-1}[n]\}$ are the only input required to the neural net singing detector as described below:

1) Initialization. Set n=0. Set $f_i[n]=r_i[n]=g_i[n]=0$ for i=0, 1, ..., M−1. Set $\alpha[n]=1.001$, which is an increase factor. It is a number slightly greater than 1 and increasing with time. A good start number is typically 1.001.

2) Given $X[n]=\{x_0[n], x_1[n], \ldots, x_{M-1}[n]\}$ M perform an inverse spectral tilt to remove the bias of the speech spectrum tilt:

$$x_i[n]=x_i[n]\cdot(Ai+B) \text{ for } i=0, 1, \ldots M-1 \quad (1)$$

where A and B are two empirical constants. Typically, A is 9 and B is 3. It is found that the human voice spectrum is biased at low frequencies. The energy of sound waves at lower frequencies is typically greater than the energy of sound waves at higher frequencies. To neutralize such bias, the reverse spectral tilt as shown in Eq. (1) may be used. Without the inverse spectral tilt operation, the detector may cause some false alarms and falsely pick the pitch period as the singing frequency.

3) Find the maximum spectral energy bin $x_{max}[n]$. That is, find the energy bin index max such that $x_{max}[n]$ is the maximum energy bin. That is, $$x_{max}[n] = \max_{0<i<M-1}\{x_i[n]\}, \quad (2)$$

4) Based on the max energy bin index max found in Step (3), adapt the maximum energy neural net node $g_{max}[n]$ with positive weight (reinforcement) and all its neighboring nodes with negative weights (inhibition):

$$g_i[n] = \begin{cases} ag_i[n-1] + (1-a)x_{max}[n] & \text{for } i = \max \\ g_i[n-1] - bx_{max}[n] & \text{for all } i \neq \max. \end{cases} \quad (3)$$

Here a and b are two adjustable constants. $g_i[n]$ records a moving average of the maximum energy. Adjusting constant a can adjust the memory of the neural network, i.e. the influence of past data on future data. a is typically between about 0.6-0.95. b typically is between 0.001 and 0.05. In one embodiment, the two constants are: a=0.875 and b=0.0125. The resulting $g_i[n]$ is hard limited between 0 and a positive constant $H_{max}$. That is, $$g_i[n] = \begin{cases} 0 & \text{if } g_i[n] < 0 \\ H_{max} & \text{if } g_i[n] > H_{max} \end{cases} \quad (4)$$

where $H_{max}$ is typically set to 0.01, which corresponds to −20 dB full scale ($10*\log_{10}(0.01)=-20$). Other suitable values may be used.

5) Based on the maximum energy bin index max found in Step (3), adapt the hit histogram neural net node $f_{max}[n]$ with positive weight and its neighboring nodes with negative weights. That is, for $0 \leq i \leq M-1$, $$f_i[n] = \begin{cases} f_i[n-1] + 1 & \text{for } i = \max \\ f_i[n-1] - 0.1 & \text{for all } i \neq \max. \end{cases} \quad (5)$$

The resulting $f_i[n]$ is hard limited between 0 and a positive constant $I_{total}$. That is, for $0 \leq i \leq M-1$, $$f_i[n] = \begin{cases} 0 & \text{if } f_i[n] < 0 \\ I_{total} & \text{if } f_i[n] > I_{total} \end{cases} \quad (6)$$

where $I_{total}$ is the maximum achievable total number of hits and is set to 30 in this embodiment. It may be varied from about 20 to about 100. It is related to the total number of frames $I_t$ used in the detection.

6) Based on the maximum energy bin index max found in Step (3), adapt the change histogram neural net node $r_{max}[n]$ with positive weight and all its neighboring nodes with negative weights. Note: this step is processed only if the spectral energy is seen to be increased with time. Thus, if $x_{max}[n] \geq \alpha[n]x_{max}[n-1]$, then $0 \leq i \leq M-1$, adapt $r_i[n]$ as $$r_i[n] = \begin{cases} r_i[n-1] + 1 & \text{for } i = \max \\ r_i[n-1] - 0.1 & \text{for all } i \neq \max. \end{cases} \quad (7)$$

The resulting $r_i[n]$ is hard limited between 0 and a positive constant $I_{total}$. That is, $$r_i[n] = \begin{cases} 0 & \text{for } r_i[n] < 0 \\ I_{total} & \text{for } r_i[n] > I_{total} \end{cases} \quad (8)$$

where $I_{total}$ is the maximum achievable total number of hits.

7) Check to see if n has increased to the test interval $I_t$. If $n=I_t$ perform the howling test at Step (8). Otherwise, perform the following updates and repeat at step 2:

$$n = n + 1 \quad (9)$$

$$\alpha[n] = \alpha[n-1] + c \quad (10)$$

where c is an acceleration factor, which is a small number. The addition of c makes the increase factor $\alpha[n]$ increases with time. The acceleration factor c is typically between 0.001 and 0.005.

8) Perform howling test as follows:
 1. Find the maximum hit histogram neural net node index max such that $$f_{max}[n] = \max_{0<i<M-1}\{f_i[n]\}, \quad (11)$$

2. Based on the node index max, perform the following threshold test. Set the flag 'HOWLING' to 1 if $$f_{max}[n] > h_f I_{total} \quad (12)$$

AND $$r_{max}[n] > h_r I_{total}$$

where $h_f$ and $h_r$ are the hit-ratio of the two neural nets F[n] and R[n] respectively. In many implementations, $h_f=0.8$ and $h_r=0.7$, and $I_{total}=30$, or at least those are the initial values before adjustment based on an actual application environment. These two hit ratios may be adapted to a particular environment of the audio system, as shown in more examples below. $h_f$ and $h_r$ may range from about 0.5 to about 0.95.

If 'HOWLING'=1, go to Step (9), else go to Step (10).

9) If howling was detected, perform the following tests to double check for false alarms (as in the case of high tonal background noise or human resonant pitch).
 1. If the resonant frequency is below 500 Hz, redo the howling test as defined in Equation (12) with higher hit ratios with $h_f=0.9$ and $h_r=0.8$. The 'HOWLING' flag is set to 0 if the new test fails. This part of the test can drastically to reduce the number of false alarms around the speech spectrum regions, where the human pitch can be highly resonant for some speaker.

2. Set 'HOWLING' to 0 if the maximum spectral energy node is less than a very small threshold:

$$g_{max}[n] \leq 0.002 \tag{13}$$

3. Go to Step (11).

10) If howling is not detected, double check the howling test done in Step (6) for the presence of any extremely large energy bins. This step is optional in most situations. A lower threshold is used for the howling test on audio frames that have large energy bins. If the maximum intensity $g_{max}$ is greater than 1850.0, set $h_f$=0.64 and $h_r$=0.50, and redo the howling test as defined in Equation (12). If the maximum intensity $g_{max}$ is greater than 298.0, set $h_f$=0.81 and $h_r$=0.72, and redo the howling test as defined in Equation (12). This part is to account for the possibility that howling can occur with multiple frequencies, which in turns, need a lower hit-ratio to meet the howling criteria.

11) If 'HOWLING'=1, reset all the histogram neural nets. That is, for $0 \leq i \leq M-1$, $f_i[n]$ and $r_i[n]$ to 0, and reset the maximum energy neural net to $g_i[n] = 0.5 * g_i[n]$. Report the howling condition to the suppression algorithm with the singing frequency location. Repeat the detection process at Step (2).

12) If 'HOWLING'=0, perform the following updates:
   1. Update $x_i[n-I_t]$ to $x_i[n]$.
   2. Set $\alpha[n]$=1.005
   3. Subtract the fraction of the hits of $r_{max}[n]$, $f_{max}[n]$ and $g_{max}$ due to the howling test interval:

$$f_{max}[n] = \left(1.0 - h_f \frac{I_t}{I_{total}}\right) f_{max}[n] \tag{14}$$

$$r_{max}[n] = \left(1.0 - h_r \frac{I_t}{I_{total}}\right) r_{max}[n] \tag{15}$$

4. Set n=0
   Go to Step (2).

In this preferred embodiment for a single detector, three neural networks G[n] 512, F[n] 514 and R[n] 516 as shown in FIG. 5 are employed. But if faster detection and lower computation requirement are more desirable than the detection accuracy (e.g. more false alarms frequency suppression), then the energy neural network G[n] 512 and related analysis may be omitted. When the energy neural network G[n] 512 is not used, then the associated steps in the description above are not relevant. More specifically, the step 4 which maintain the energy neural network is not necessary. Step 9 substep 2, step 10 and part of step 11, which adjust the thresholds $h_f$ and $h_r$ of the hit network and the change network based on the condition of the energy neural network G[n], are not performed. Such a simplified method is adequate for many common audio system applications and can be very useful.

In another embodiment of the current invention, the $I_t$ may be made the same as the $I_{total}$, i.e. doing the howling testing only once in each cycle. In this simplified method, step 12 of the preferred embodiment is irrelevant. Each howling testing is independent from each other. This embodiment is faster and requires less computation than the preferred embodiment. The drawback is that the selection of an appropriate $I_t$ may be difficult for a particular application. Long $I_t$ provides more accuracy, but may be too slow in responding to a singing frequency. Short $I_t$ provides fast response, but may cause excessive errors and degrade the system performance. Having both an $I_t$ and an $I_{total}$ as in the preferred embodiment, both responsiveness and accuracy are achieved, at the expense of system complexity and computational overhead. The size of $I_{total}$ may depend on the sampling frequency and the time length of howling detecting period. The howling detecting period is typically 100 ms to 1 second. In the above example, the howling detecting period is 160 ms. $I_{total}$ is 30 and $I_t$ is 5. $I_t$ is typically a fraction of $I_{total}$.

Two-Stage (or Multiple-stage) Detector:

The single (or single stage) detector with two or three neural networks performs well in most conditions, but through the testing of many different input signals with different room response, the results indicated that a single detector may not always detect a howling condition in the presence of a tonal signal (noise or tone) unless the singing frequency bin has energy exceeding that of the tonal noise. A tonal noise is typically a background noise with large energy at a tone frequency, such as the noises from air conditioner, electric appliance etc. The tone or tonal noise do not necessarily cause "howling" even though it has a large energy at the tone frequency. If it does not cause a "howling," then it can mask the "howling" frequency from early detection. However, for optimal performance the howling detector needs to find the singing frequency as early and fast as it can and most often at the time when the howling energy bin is much smaller than that of the tonal signal. To circumvent this problem the detector may include a two-stage neural net, each stage has multiple neural networks.

The two stage detector has two detectors, a first stage and a second stage, each of which is almost the same as described above in the single detector. The first stage operates the same way as described above, while the second stage operates slightly differently. For the second stage detector, rather than strengthen the maximum frequency bin of each audio frame, the second stage suppresses the maximum frequency and its two neighbors. Then it strengthens the second largest frequency. If the first stage detects a "howling" frequency, then the second stage detector is not checked. If the first stage does not detect a "howling" frequency, then the second stage detector is checked to see whether there is a "howling" frequency with a smaller but increasing and accelerating energy. Thus the second stage may detect a "howling" frequency that the first stage detector may not detect until a later time, which may be too late.

The improved algorithm can be described as follows in more details:

1. Assume that we have two neural net howling detectors $D_1 = \{G^1[n], F^1[n], R^2[n]\}$ and $D_2 = \{G^2[n], F^2[n], R^2[n]\}$. Each detector is the same as discussed in the single detector. In this example, each detector has three neural nets. Note that each neural net in each detector (for example, $G^1[n]$) contains M nodes (for example, $\{g_1[m], g_2[n] \ldots, g_{M-2}[n]\}$). $D_1$ is the first stage detector and $D_2$ is the second stage detector.

2. Given $X[n] = \{x_0[n], x_1[n], \ldots, x_{M-1}[n]\}$ perform the first stage detector test as defined in single detector.

3. If 'HOWLING'=0, go to Step (4), else go to Step (2) and repeat the process. Essentially, if the first stage detects a "howling" frequency, then the singing frequency is reported and is suppressed. There is no need to invoke the second stage. But if there is no "howling" frequency, then the second stage is invoked to ensure that a potential singing frequency is not masked by the large tonal noise. The second stage process is what is described in the next step, step 4.

4. At this stage, the first neural net has not detected 'HOWLING', but we want to be certain that the test holds if we remove any possible tonal noise and repeat the test. To do this we set the maximum energy bin and its neighboring bins on both sides to a very small negligible value and repeat the detection process with the second neural net $D_2$. That is, $$x_j[n]=\beta x_j[n], \text{ for max}-1\leq j\leq\text{max}+1 \qquad (16)$$

where $\beta=0.0000000001$, and max is the bin index for which $x_{max}[n]$ is the maximum energy bin for all bins $\{x_0[n], x_1[n], \ldots x_{M-1}[n]\}$.

5. Perform the same operation as described in the single detector. Check whether $D_2$ identifies a "howling" frequency. If not, go to Step (2) and repeat. If $D_2$ detects a "howling" frequency, then it reports the frequency to the suppression module to suppress such "howling" frequency.

The two-stage detector has been shown to perform very well in the presence of any strong tonal noise or tonal signal. If there is no strong tonal noise, then the second stage neural network could identify a second singing frequency, which is smaller and increases slower than the first singing frequency. In situations where more than one singing frequencies may become "howling" frequencies, the two-stage detector may identify the two frequencies at about the same time, i.e. within the same testing time period. If a single detector is used, then the second singing frequency may be detected in the next testing period after the first singing frequency is identified. If it is desirable to have more potential singing frequencies identified in a single testing period, then more stages or detectors may be utilized. Obviously, when more detectors are used, more computation capacity is required to process the additional analysis. But otherwise, there is no other adverse effect on the audio system.

The embodiments of current invention maintain a plurality of sets of data points to track the maximum energies of the frequency domain energy bins for audio frames, the times a particular frequency sample has the maximum energy and the changes in the maximum energies etc. The sets of data points may be implemented as several neural networks to emulate the occurrence of howling in an audio system. The howling detectors according to the current invention are non-intrusive to the audio system. Only when howling is detected, does the detector instruct a howling suppressor to suppress the singing frequency. The emulator can expedite the identification of frequencies that are progressing toward howling before the howling is detectable to human through the actual audio system, such that potential howling can be acted upon, i.e. eliminated. The current invention is insensitive to the resolution of the FFT which converts time domain samples to frequency domain. Therefore, a lower resolution FFT may be used which can reduce the computation load substantially. Once potential howling is detected, the audio samples may be analyzed with a higher resolution FFT, if more accurate identification of the singing frequency is desired. In this case, high resolution FFT analysis is performed on a relatively small subset of the data. The current invention may adjust its desired performance with the requirement of computational requirement and system complexity. The system can be upgraded easily with the additional neural networks or additional detectors when more computational capacity becomes available to detect multiple "howling" frequencies simultaneously.

The above examples are all related to audio signal processing systems, but the current invention may be used in other signal processing systems as well, as long as there is a closed-loop, for example, a self adjusting control loop. The current invention may be used to detect any howling situations where part of the signal is strengthened each time it passes through the closed loop. If the overall gain is above a threshold, then a howling condition can occur. The current invention can detect such howling condition before it actually occurs.

The embodiments of the current invention may be implemented as a software program executed by a centrally located processor, as described above, they may also be implemented in many other ways. For example, each set of data points or neural network may be implemented in an independent neural network device which tracks the frequency domain energy bins. Several such neural network devices may work together under the control of a central processor. Each neural network device may update its nodes continuously and report conditions that may exceed the howling criteria to the central processor. The central processor then determines whether a howling is likely to occur and suppresses such the singing frequency.

The howling detector may also be embedded in a microphone module. When a singing frequency is detected, it is suppressed before the audio signal is sent out of the microphone for further processing. This way, if all microphones in an audio system are feedback elimination capable microphone, then the audio system cannot have howling again. Such microphone can then be used with any audio systems, especially the ones that do not have the feedback elimination capability. This way, an existing audio system can be upgraded to a high end audio system with premier feedback elimination capability with only small and incremental cost.

In the claim section of the current application, the element numbers/labels are for identification purposes only. The numbers or labels do not indicate the sequence of the steps in operation, unless explicitly stated or by context, i.e. the step 2 does not necessarily need to be executed after the step 1 and before step 3. It is possible that step 2 is executed after step 3 or before step 1.

While exemplary embodiments of the invention have been illustrated and described, it will be appreciated that various changes can be made therein without departing from the spirit and scope of the invention.

We claim:

1. A device for detecting a singing frequency of audio in a room represented by an audio signal in a signal processing system, the device comprising:
a set of hit data points which is tracking the hits of frequency domain energy bins for each time frame signal of the audio signal;
a set of change data points which is tracking the changes of the frequency domain energy bins for the time frame signal of the audio signal; and
a control module communicating with the hit set and the change set,
wherein the control module operates to determine a singing frequency is a hit frequency of the hit set where the hit data point has a maximum hit strength,
if the maximum hit strength exceeds a hit threshold and
if the strength of the change data point in the change set with the hit frequency exceeds a change threshold.

2. The device of claim 1, wherein the control module further operates to,
strengthen a hit data point of a max frequency which has the maximum energy and weakening all remaining hit data points; and
strengthen a change data point with the max frequency which has the maximum energy and weakening all remaining change data points if the maximum energy in the current time frame is greater than the last time frame.

3. The device of claim 2,
wherein the hit set is a hit neural network and each data point is a hit node; and wherein the change set is a change neural network and each data point is a change node.

4. The device of claim 3, wherein the control module further operable operates to:
apply a reversed tilt on the frequency domain samples.

5. The device of claim 4,
wherein the frequency domain energy bins are denoted as $X[n]=\{x_0[n], x_1[n], \ldots, x_{M-1}[n]\}$, wherein each component $x_i[n]$ is the $i^{th}$ bin of the spectral energy corresponding to spectral content of a signal frame, and where a total of M spectral bins covering the whole spectrum of the signal frame; and
wherein the reversed tilt on the frequency domain energy bins has the form of $x_i[n]=x_i[n] \cdot (Ai+B)$ for $i=0, 1, \ldots M-1$, where A and B are two constants.

6. The device of claim 5,
wherein constant A is 9 and constant B is 3.

7. The device of claim 5,
wherein the hit set of data points is a hit neural network and the change set of data points is a change neural network.

8. The device of claim 5,
wherein the hit neural network is denoted as $F[n]=\{f_0[n], f_1[n], \ldots, f_{M-1}[n]\}$ and the change neural network is denoted as $R[n]=\{r_0[n], r_1[n], \ldots, r_{M-1}[n]\}$, where n is an index of time frame between 1 through I, where I is the number of frames for detection;
wherein each hit neural network node is strengthened and weakened according a hit update formula:

$$f_i[n] = \begin{cases} f_i[n-1]+1 \\ f_i[n-1]-0.1 \end{cases}$$

and $f_i[n]$ is hard limited between 0 and a positive constant $I_{total}$ according to $$f_i[n] = \begin{cases} 0 & \text{if } f_i[n] < 0 \\ I_{total} & \text{if } f_i[n] > I_{total} \end{cases}$$

for $0 \leq i \leq M-1$; and
wherein each change neural network node is strengthened and weakened according a change update formula:

$$r_i[n] = \begin{cases} r_i[n-1]+1 \\ r_i[n-1]-0.1 \end{cases}$$

and $r_i[n]$ is hard limited between 0 and a positive constant $I_{total}$ according to $$r_i[n] = \begin{cases} 0 & \text{for } r_i[n] < 0 \\ I_{total} & \text{for } r_i[n] > I_{total} \end{cases}$$

only if $x_{max}[n] \geq \alpha[n]x_{max}[n-1]$, where $(\alpha[n]-1)$ is a small positive number and $I_{total}$ is an integer not less than $I_t$.

9. The device of claim 8,
wherein the hit threshold and the change threshold are $$f_{max}[n] > h_f I_{total}$$

AND $$r_{max}[n] > h_r I_{total},$$

wherein $h_f$ and $h_r$ are two constants.

10. The device of claim 9,
wherein $h_f$ and $h_r$ are two constants range from 0.5-0.95; and
wherein $(\alpha[n]-1)$ is increasing with n.

11. The device of claim 3, wherein the control module further operates to,
maintain an energy neural network for frequency domain energy bins for each time frame signal;
strengthen the energy node of the max frequency proportional to the maximum energy and weakening all remaining energy nodes; and
adjust the hit threshold and the change threshold based on the maximum strength of the energy node.

12. The device of claim 11,
wherein the frequency domain energy bins is denoted as $X[n]=\{x_0[n], x_1[n], \ldots, x_{M-1}[n]\}$, wherein each component $x_i[n]$ is the $i^{th}$ bin of the spectral energy corresponding to spectral content of a signal frame, and wherein a total of M spectral bins covering the whole spectrum of the signal frame; and
wherein the reversed tilt on the frequency domain energy bins has the form of $x_i[n]=x_i[n] \cdot (Ai+B)$ for $i=0, 1, \ldots M-1$, where A and B are two constants.

13. The device of claim 12,
wherein the maximum energy is $$x_{max}[n] = \max_{0 \leq i < M-1} \{x_i[n]\};$$

wherein the energy neural network is denoted as $G[n]=\{g_0[n], g_1[n], \ldots, g_{M-1}[n]\}$, the hit neural network is denoted as $F[n]=\{f_0[n], f_1[n], \ldots, f_{M-1}[n]\}$ and the change neural network is denoted as $R[n]=\{r_0[n], r_1[n], \ldots, r_{M-1}[n]\}$, where n is an index of time frame between 1 through I, where I is the number of frames for detection;
wherein each energy neural network node is strengthened and weakened according a hit update formula:

$$g_i[n] = \begin{cases} ag_i[n-1]+(1-a)x_{max}[n] \\ g_i[n-1]-bx_{max}[n] \end{cases}$$

and a and b are two adjustable constants;
wherein each hit neural network node is strengthened and weakened according a hit update formula:

$$f_i[n] = \begin{cases} f_i[n-1]+1 \\ f_i[n-1]-0.1 \end{cases}$$

and $f_i[n]$ is hard limited between 0 and a positive constant $I_{total}$ according to $$f_i[n] = \begin{cases} 0 & \text{if } f_i[n] < 0 \\ I_{total} & \text{if } f_i[n] > I_{total} \end{cases}$$

for $0 \leq i \leq M-1$; and
wherein each change neural network node is strengthened and weakened according a change update formula:

$$r_i[n] = \begin{cases} r_i[n-1] + 1 \\ r_i[n-1] - 0.1 \end{cases}$$

and $r_i[n]$ is hard limited between 0 and a positive constant $I_{total}$ according to $$r_i[n] = \begin{cases} 0 & \text{for } r_i[n] < 0 \\ I_{total} & \text{for } r_i[n] > I_{total} \end{cases}$$

only if $x_{max}[n] \geq \alpha[n] x_{max}[n-1]$, where $\alpha[n]-1$ is a small positive number.

14. The device of claim 13,
wherein the hit threshold and the change threshold are $$\begin{array}{ccc} f_{max}[n] & > & h_f I_{total} \\ & \text{AND} & , \\ r_{max}[n] & > & h_r I_{total} \end{array}$$

wherein $h_f$ and $h_r$ are two constants.

15. The device of claim 14,
wherein $h_f$ and $h_r$ are two constants range from 0.5-0.95; and
wherein ($\alpha[n]-1$) is increasing with n.

16. The device of claim 13,
wherein a is between 0.6-0.95 and b is between 0.001 and 0.05.

17. The device of claim 13,
wherein $g_i[n]$ is hard limited between 0 and a positive constant $H_{max}$, $$g_i[n] = \begin{cases} 0 & \text{if } g_i[n] < 0 \\ H_{max} & \text{if } g_i[n] > H_{max} \end{cases}.$$

18. The device of claim 13, wherein the control module further operable to,
determine no singing frequency exists if $g_{max}[n] \leq 0.002$, regardless whether the maximum hit strength exceeds the hit threshold and the strength of the change node with the hit frequency exceeds the change threshold.

19. The device of claim 13, wherein the control module further operable to,
change $h_f$ to equal or above 0.9 and $h_r$ to equal or above 0.8 if the max frequency is less than or equal to 500 Hz.

20. The device of claim 13, wherein the control module further operable to,
change $h_f$ to equal to or below 0.81 and $h_r$ to equal to or below 0.72 if $g_{max}[n]$ is equal to or greater than 298.

21. The device of claim 13, wherein the control module further operable to,
change $h_f$ to 0.64 and $h_r$ to 0.5 if $g_{max}[n]$ is equal to or greater than 1850.

22. The device of claim 13, wherein the control module further operable to,
set $f_i[n]$ and $r_i[n]$ to 0 for $0 \leq i \leq M-1$, and setting the energy neural network to $g_i[n]=0.5*g_i[n]$ if a singing frequency is determined.

23. The device of claim 13, wherein the control module is further operable to,
set $$f_{max}[n] = \left(1.0 - h_f \frac{I_t}{I_{total}}\right) f_{max}[n]$$

and $$r_{max}[n] = \left(1.0 - h_r \frac{I_t}{I_{total}}\right) r_{max}[n]$$

if a singing frequency is not determined.

24. The device of claim 3, wherein the control module further operable to,
maintain a second hit neural network and a second change neural network for frequency domain energy bins for each time frame signal;
if a singing frequency is not determined, process the following steps on the second hit neural network and the second change neural network:
weaken the node of the second hit neural network of the max frequency which has the maximum energy to close to zero;
weaken the node of the second change neural network of the max frequency which has the maximum energy to close to zero;
strengthen the node of the second hit neural network of the second max frequency which has a second maximum energy and weakening all remaining nodes of the second hit neural network;
strengthen the node of the second change neural network with the second max frequency which has the second maximum energy and weakening all remaining nodes of the second change neural network if the second maximum energy in the current time frame is greater than the last time frame;
locate the node of the second hit neural network with a maximum hit strength and its corresponding hit frequency; and
determine a singing frequency is the hit frequency with the maximum hit strength if the maximum hit strength of the second hit network exceeds the hit threshold and the strength of the change node of the second change network with the hit frequency exceeds the change threshold.

25. A method for detecting a singing frequency of audio in a room represented by an audio signal in a signal processing system, the method comprising:
1) maintaining a hit set of data points and a change set of data points for frequency domain energy bins in each time frame signal of the audio signal, wherein each data point has an energy strength and a frequency;
2) updating the hit set and the change set with frequency domain energy bins for each time frame signal of the audio signal;
3) repeating step 2) for a first number ($I_t$) of times;
4) determining a singing frequency of the audio signal which is a hit frequency with a maximum energy strength if the maximum energy strength exceeds a hit threshold and the strength of the change data point with the hit frequency exceeds a change threshold;
5) repeating steps 2-4 if a singing frequency of the audio signal is not determined; and
6) providing a singing frequency signal to allow suppression of the singing frequency.

26. The method of claim 25 wherein step 2) comprises:
7) strengthening a hit data point of a max energy strength frequency and weakening all remaining hit data points; and
8) strengthening a change data point of the max energy strength frequency and weakening all remaining change data points if the maximum energy in the current time frame is greater than the last time frame.

27. The method of claim 26, the method further comprising:
9) applying a reversed tilt on the frequency domain samples.

28. The method of claim 27,
wherein the frequency domain energy bins are denoted as $X[n]=\{x_0[n], x_1[n], \ldots, x_{M-1}[n]\}$, wherein each component $x_i[n]$ is the $i^{th}$ bin of the spectral energy corresponding to spectral content of a signal frame, and where a total of M spectral bins covering the whole spectrum of the signal frame; and
wherein the reversed tilt on the frequency domain energy bins has the form of $x_i[n]=x_i[n]\cdot(Ai+B)$ for $i=0, 1, \ldots M-1$, where A and B are two constants.

29. The method of claim 28,
wherein constant A is 9 and constant B is 3.

30. The method of claim 28,
wherein the hit set of data points is a hit neural network and the change set of data points is a change neural network.

31. The method of claim 28,
wherein the hit neural network is denoted as $F[n]=\{f_0[n], f_1[n], \ldots, f_{M-1}[n]\}$ and the change neural network is denoted as $R[n]=\{r_0[n], r_1[n], \ldots, r_{M-1}[n]\}$, where n is an index of time frame between 1 through I, where I is the number of frames for detection;
wherein each hit neural network node is strengthened and weakened according a hit update formula:

$$f_i[n] = \begin{cases} f_i[n-1]+1 & \text{for } i = \max \\ f_i[n-1]-0.1 & \text{for all } i \neq \max. \end{cases}$$

and $f_i[n]$ is hard limited between 0 and a positive constant $I_{total}$ according to $$f_i[n] = \begin{cases} 0 & \text{if } f_i[n] < 0 \\ I_{total} & \text{if } f_i[n] > I_{total} \end{cases}$$

for $0 \leq i \leq M-1$; and
wherein each change neural network node is strengthened and weakened according a change update formula:

$$r_i[n] = \begin{cases} r_i[n-1]+1 & \text{for } i = \max \\ r_i[n-1]-0.1 & \text{for all } i \neq \max. \end{cases}$$

and $r_i[n]$ is hard limited between 0 and a positive constant $I_{total}$ according to $$r_i[n] = \begin{cases} 0 & \text{for } r_i[n] < 0 \\ I_{total} & \text{for } r_i[n] > I_{total} \end{cases}$$

only if $x_{max}[n] \geq \alpha[n]x_{max}=[n-1]$, where $(\alpha[n]-1)$ is a small positive number and $I_{total}$ is an integer not less than $I_t$.

32. The method of claim 31,
wherein the hit threshold and the change threshold are $$f_{max}[n] > h_f I_{total}$$

AND $$r_{max}[n] > h_r I_{total},$$

wherein $h_f$ and $h_r$ are two constants.

33. The method of claim 32,
wherein $h_f$ and $h_r$ are two constants range from 0.5-0.95; and
wherein $(\alpha[n]-1)$ is increasing with n.

34. The method of claim 26, further comprising:
9) maintaining an energy neural network for frequency domain energy bins for each time frame signal;
10) strengthening the energy node of the max frequency proportional to the maximum energy and weakening all remaining energy nodes; and
11) adjusting the hit threshold and the change threshold based on the maximum strength of the energy node.

35. The method of claim 34, further comprising:
wherein the frequency domain energy bins is denoted as $X[n]=\{x_0[n], x_1[n], \ldots, x_{M-1}[n]\}$, wherein each component $x_i[n]$ is the $i^{th}$ bin of the spectral energy corresponding to spectral content of a signal frame, and wherein a total of M spectral bins covering the whole spectrum of the signal frame; and
wherein the reversed tilt on the frequency domain energy bins has the form of $x_i[n]=x_i[n]\cdot(Ai+B)$ for $i=0, 1, \ldots M-1$, where A and B are two constants.

36. The method of claim 35,
wherein the maximum energy is $$x_{max}[n] = \max_{0 \leq i \leq M-1}\{x_i[n]\};$$

wherein the energy neural network is denoted as $G[n]=\{g_0[n], g_1[n], \ldots, g_{M-1}[n]\}$, the hit neural network is denoted as $F[n]=\{f_0[n], f_1[n], \ldots, f_{M-1}[n]\}$ and the change neural network is denoted as $R[n]=\{r_0[n], r_1[n], \ldots, r_{M-1}[n]\}$, where n is an index of time frame between 1 through I, where I is the number of frames for detection;
wherein each energy neural network node is strengthened and weakened according a hit update formula:

$$g_i[n] = \begin{cases} ag_i[n-1]+(1-a)x_{max}[n] & \text{for } i = \max \\ g_i[n-1]-bx_{max}[n] & \text{for all } i \neq \max. \end{cases}$$

and a and b are two adjustable constants;
wherein each hit neural network node is strengthened and weakened according a hit update formula:

$$f_i[n] = \begin{cases} f_i[n-1] + 1 & \text{for } i = \max \\ f_i[n-1] - 0.1 & \text{for all } i \neq \max \end{cases}$$

and f[n] is hard limited between 0 and a positive constant $I_{total}$ according to $$f_i[n] = \begin{cases} 0 & \text{if } f_i[n] < 0 \\ I_{total} & \text{if } f_i[n] > I_{total} \end{cases}$$

for $0 \leq i \leq M-1$; and
wherein each change neural network node is strengthened and weakened according a change update formula:

$$r_i[n] = \begin{cases} r_i[n-1] + 1 & \text{for } i = \max \\ r_i[n-1] - 0.1 & \text{for all } i \neq \max \end{cases}$$

and $r_i[n]$ is hard limited between 0 and a positive constant $I_{total}$ according to $$r_i[n] = \begin{cases} 0 & \text{for } r_i[n] < 0 \\ I_{total} & \text{for } r_i[n] > I_{total} \end{cases}$$

only if $x_{max}[n] \geq \alpha[n] x_{max}[n-1]$, where $(\alpha[n]-1)$ is a small positive number.

37. The method of claim 36,
wherein the hit threshold and the change threshold are $$f_{max}[n] > h_f I_{total}$$

AND $$r_{max}[n] > h_r I_{total},$$

wherein $h_f$ and $h_r$ are two constants.

38. The method of claim 37,
wherein $h_f$ and $h_r$ are two constants range from 0.5-0.95; and
wherein $(\alpha[n]-1)$ is increasing with n.

39. The method of claim 36,
wherein a is between 0.6-0.95 and b is between 0.001 and 0.05.

40. The method of claim 36,
wherein $g_i[n]$ is hard limited between 0 and a positive constant $H_{max}$, $$g_i[n] = \begin{cases} 0 & \text{if } g_i[n] < 0 \\ H_{max} & \text{if } g_i[n] > H_{max} \end{cases}.$$

41. The method of claim 36, further comprising:
12) determining no singing frequency exists if $g_{max}[n] \leq 0.002$, regardless whether the maximum hit strength exceeds the hit threshold and the strength of the change node with the hit frequency exceeds the change threshold.

42. The method of claim 36, further comprising:
12) changing $h_f$ to equal or above 0.9 and $h_r$ to equal or above 0.8 if the max frequency is less than or equal to 500 Hz.

43. The method of claim 36, further comprising:
12) changing $h_f$ to equal to or below 0.81 and $h_r$ to equal to or below 0.72 if $g_{max}[n]$ is equal to or greater than 298.

44. The method of claim 36, further comprising:
12) changing $h_f$ to 0.64 and $h_r$ to 0.5 if $g_{max}[n]$ is equal to or greater than 1850.

45. The method of claim 36, further comprising:
12) setting $f_i[n]$ and $r_i[n]$ to 0 for $0 \leq i \leq M-1$, and setting the energy neural network to $g_i[n] = 0.5 * g_i[n]$ if a singing frequency is determined.

46. The method of claim 36, further comprising:
12) setting $$f_{max}[n] = \left(1.0 - h_f \frac{I_t}{I_{total}}\right) f_{max}[n] \text{ and } r_{max}[n] = \left(1.0 - h_r \frac{I_t}{I_{total}}\right) r_{max}[n]$$

if a singing frequency is not determined.

47. The method of claim 26, further comprising:
9) maintaining a second hit neural network and a second change neural network for frequency domain energy bins for each time frame signal;
if a singing frequency is not determined, processing the following steps on the second hit neural network and the second change neural network:
10) weakening the node of the second hit neural network of the max frequency which has the maximum energy to close to zero;
11) weakening the node of the second change neural network of the max frequency which has the maximum energy to close to zero;
12) strengthening the node of the second hit neural network of the second max frequency which has a second maximum energy and weakening all remaining nodes of the second hit neural network;
13) strengthening the node of the second change neural network with the second max frequency which has the second maximum energy and weakening all remaining nodes of the second change neural network if the second maximum energy in the current time frame is greater than the last time frame;
14) locating the node of the second hit neural network with a maximum hit strength and its corresponding hit frequency; and
15) determining a singing frequency is the hit frequency with the maximum hit strength if the maximum hit strength of the second hit network exceeds the hit threshold and the strength of the change node of the second change network with the hit frequency exceeds the change threshold.

48. A microphone module comprising:
a microphone element for receiving audio in a room and providing an audio signal; and
a processor coupled to the microphone element;
wherein the processor is operable to perform a method of:
1) maintaining a hit set of data points and a change set of data points for frequency domain energy bins in each time frame signal of the audio signal, wherein each data point has an energy strength and a frequency;
2) updating the hit set and the change set with frequency domain energy bins for each time frame signal of the audio signal;

3) repeating step 2) for first number ($I_t$) of times;

4) determining a singing frequency is a hit frequency with a maximum energy strength if the maximum energy strength exceeds a hit threshold and the strength of the change data point with the hit frequency exceeds a change threshold;

5) repeating steps 2-4 if a singing frequency is not determined; and 6) providing a singing frequency signal to allow suppression of the singing frequency.

49. The microphone module of claim 48, wherein step 2) comprising:

7) strengthening a hit data point of a max energy strength frequency and weakening all remaining hit data points; and 8) strengthening a change data point of the max energy strength frequency and weakening all remaining change data points if the maximum energy in the current time frame is greater than the last time frame.

50. The microphone module of claim 49, the method further comprising:

9) applying a reversed tilt on the frequency domain samples.

51. The microphone module of claim 50, wherein the frequency domain energy bins are denoted as $X[n]=\{x_0[n], x_1[n], \ldots, x_{M-1}[n]\}$, wherein each component $x_i[n]$ is the $i^{th}$ bin of the spectral energy corresponding to spectral content of a signal frame, and where a total of M spectral bins covering the whole spectrum of the signal frame; and wherein the reversed tilt on the frequency domain energy bins has the form of $x_i[n]=x_i[n]\cdot(Ai+B)$ for $i=0, 1, \ldots M-1$, where A and B are two constants.

52. The microphone module of claim 51, wherein constant A is 9 and constant B is 3.

53. The microphone module of claim 51, wherein the hit set of data points is a hit neural network and the change set of data points is a change neural network.

54. The microphone module of claim 51, wherein the hit neural network is denoted as $F[n]=\{f_0[n], f_1[n], \ldots, f_{M-1}[n]\}$ and the change neural network is denoted as $R[n]=\{r_0[n], r_1[n], \ldots, r_{M-1}[n]\}$, where n is an index of time frame between 1 through I, where I is the number of frames for detection;

wherein each hit neural network node is strengthened and weakened according a hit update formula:

$$f_i[n] = \begin{cases} f_i[n-1]+1 & \text{for } i = \max \\ f_i[n-1]-0.1 & \text{for all } i \neq \max. \end{cases}$$

and $f_i[n]$ is hard limited between 0 and a positive constant $I_{total}$ according to $$f_i[n] = \begin{cases} 0 & \text{if } f_i[n] < 0 \\ I_{total} & \text{if } f_i[n] > I_{total} \end{cases}$$

for $0 \leq i \leq M-1$; and wherein each change neural network node is strengthened and weakened according a change update formula:

$$r_i[n] = \begin{cases} r_i[n-1]+1 & \text{for } i = \max \\ r_i[n-1]-0.1 & \text{for all } i \neq \max. \end{cases}$$

and $r_i[n]$ is hard limited between 0 and a positive constant $I_{total}$ according to $$r_i[n] = \begin{cases} 0 & \text{for } r_i[n] < 0 \\ I_{total} & \text{for } r_i[n] > I_{total} \end{cases}$$

only if $x_{max}[n] \geq \alpha[n]x_{max}[n-1]$, where $(\alpha[n]-1)$ is a small positive number and $I_{total}$ is an integer not less than $I_t$.

55. The microphone module of claim 54, wherein the hit threshold and the change threshold are $$f_{max}[n] > h_f I_{total}$$

AND $$r_{max}[n] > h_r I_{total},$$

wherein $h_f$ and $h_r$ are two constants.

56. The microphone module of claim 55, wherein $h_f$ and $h_r$ are two constants range from 0.5-0.95; and wherein $(\alpha[n]-1)$ is increasing with n.

57. The microphone module of claim 49, further comprising:

9) maintaining an energy neural network for frequency domain energy bins for each time frame signal;

10) strengthening the energy node of the max frequency proportional to the maximum energy and weakening all remaining energy nodes; and 11) adjusting the hit threshold and the change threshold based on the maximum strength of the energy node.

58. The microphone module of claim 57, further comprising:

wherein the frequency domain energy bins is denoted as $X[n]=\{x_0[n], x_1[n], \ldots, x_{M-1}[n]\}$, wherein each component $x_i[n]$ is the $i^{th}$ bin of the spectral energy corresponding to spectral content of a signal frame, and wherein a total of M spectral bins covering the whole spectrum of the signal frame; and wherein the reversed tilt on the frequency domain energy bins has the form of $x_i[n]=x_i[n]\cdot(Ai+B)$ for $i=0, 1, \ldots M-1$, where A and B are two constants.

59. The microphone module of claim 58, wherein the maximum energy is $$x_{max}[n] = \max_{0 < i < M-1}\{x_i[n]\};$$

wherein the energy neural network is denoted as $G[n]=\{g_0[n], g_1[n], \ldots, g_{M-1}[n]\}$, the hit neural network is denoted as $F[n]=\{f_0[n], f_1[n], \ldots, f_{M-1}[n]\}$ and the change neural network is denoted as $R[n]=\{r_0[n], r_1[n], \ldots, r_{M-1}[n]\}$, where n is an index of time frame between 1 through I, where I is the number of frames for detection;

wherein each energy neural network node is strengthened and weakened according a hit update formula:

$$g_i[n] = \begin{cases} ag_i[n-1] + (1-a)x_{max}[n] & \text{for } i = \max \\ g_i[n-1] - bx_{max}[n] & \text{for all } i \neq \max \end{cases}$$

and a and b are two adjustable constants;
wherein each hit neural network node is strengthened and weakened according a hit update formula:

$$f_i[n] = \begin{cases} f_i[n-1] + 1 & \text{for } i = \max \\ f_i[n-1] - 0.1 & \text{for all } i \neq \max \end{cases}$$

and $f_i[n]$ is hard limited between 0 and a positive constant $I_{total}$ according to $$f_i[n] = \begin{cases} 0 & \text{if } f_i[n] < 0 \\ I_{total} & \text{if } f_i[n] > I_{total} \end{cases}$$

for $0 \leq i \leq M-1$; and
wherein each change neural network node is strengthened and weakened according a change update formula:

$$r_i[n] = \begin{cases} r_i[n-1] + 1 & \text{for } i = \max \\ r_i[n-1] - 0.1 & \text{for all } i \neq \max \end{cases}$$

and $r_i[n]$ is hard limited between 0 and a positive constant $I_{total}$ according to $$r_i[n] = \begin{cases} 0 & \text{for } r_i[n] < 0 \\ I_{total} & \text{for } r_i[n] > I_{total} \end{cases}$$

only if $x_{max}[n] \geq \alpha[n]x_{max}[n-1]$, where $(\alpha[n]-1)$ is a small positive number.

60. The microphone module of claim 59,
wherein the hit threshold and the change threshold are $$f_{max}[n] > h_f I_{total}$$

AND $$r_{max}[n] > h_r I_{total},$$

wherein $h_f$ and $h_r$ are two constants.

61. The microphone module of claim 60,
wherein $h_f$ and $h_r$ are two constants range from 0.5-0.95; and
wherein $(\alpha[n]-1)$ is increasing with n.

62. The microphone module of claim 59,
wherein a is between 0.6-0.95 and b is between 0.001 and 0.05.

63. The microphone module of claim 59,
wherein $g_i[n]$ is hard limited between 0 and a positive constant $H_{max}$, $$g_i[n] = \begin{cases} 0 & \text{if } g_i[n] < 0 \\ H_{max} & \text{if } g_i[n] > H_{max} \end{cases}.$$

64. The microphone module of claim 59, further comprising:
   12) determining no singing frequency exists if $g_{max}[n] \leq 0.002$, regardless whether the maximum hit strength exceeds the hit threshold and the strength of the change node with the hit frequency exceeds the change threshold.

65. The microphone module of claim 59, further comprising:
   12) changing $h_f$ to equal or above 0.9 and $h_r$ to equal or above 0.8 if the max frequency is less than or equal to 500 Hz.

66. The microphone module of claim 59, further comprising:
   12) changing $h_f$ to equal to or below 0.81 and $h_r$ to equal to or below 0.72 if $g_{max}[n]$ is equal to or greater than 298.

67. The microphone module of claim 59, further comprising:
   12) changing $h_f$ to 0.64 and $h_r$ to 0.5 if $g_{max}[n]$ is equal to or greater than 1850.

68. The microphone module of claim 59, further comprising:
   12) setting $f_i[n]$ and $r_i[n]$ to 0 for $0 \leq i \leq M-1$, and setting the energy neural network to $g_i[n]=0.5*g_i[n]$ if a singing frequency is determined.

69. The microphone module of claim 59, further comprising:
   12) setting $$f_{max}[n] = \left(1.0 - h_f \frac{I_t}{I_{total}}\right) f_{max}[n]$$

and $$r_{max}[n] = \left(1.0 - h_r \frac{I_t}{I_{total}}\right) r_{max}[n]$$

if a singing frequency is not determined.

70. The microphone module of claim 49, further comprising:
   9) maintaining a second hit neural network and a second change neural network for frequency domain energy bins for each time frame signal;
   if a singing frequency is not determined, processing the following steps on the second hit neural network and the second change neural network:
   10) weakening the node of the second hit neural network of the max frequency which has the maximum energy to close to zero;
   11) weakening the node of the second change neural network of the max frequency which has the maximum energy to close to zero;
   12) strengthening the node of the second hit neural network of the second max frequency which has a second maximum energy and weakening all remaining nodes of the second hit neural network;
   13) strengthening the node of the second change neural network with the second max frequency which has the second maximum energy and weakening all remaining nodes of the second change neural network if the second maximum energy in the current time frame is greater than the last time frame;

14) locating the node of the second hit neural network with a maximum hit strength and its corresponding hit frequency; and 15) determining a singing frequency is the hit frequency with the maximum hit strength if the maximum hit strength of the second hit network exceeds the hit threshold and the strength of the change node of the second change network with the hit frequency exceeds the change threshold.

71. An audio system comprising:
a microphone element for receiving audio in a room and providing an audio signal;
a loudspeaker for providing audio to a room;
an amplifier coupled to the microphone element and the loudspeaker; and
a processor coupled to the microphone element and the amplifier;
wherein the processor is operable to perform the method of:
1) maintaining a hit set of data points and a change set of data points for the frequency domain energy bins in each time frame signal of the audio signal, wherein each data point has an energy strength and a frequency;
2) updating the hit set and the change set with frequency domain energy bins for each time frame signal of the audio signal;
3) repeating step 2) for a first number ($I_t$) of times;
4) determining a singing frequency of the audio signal which is a hit frequency with a maximum energy strength if the maximum energy strength exceeds a hit threshold and the strength of the change data point with the hit frequency exceeds a change threshold;
5) repeating steps 2-4 if a singing frequency is not determined; and
6) providing a singing frequency signal to the amplifier to allow suppression of the singing frequency.

72. The audio system of claim 71, wherein step 2) comprising:
7) strengthening a hit data point of a max energy strength frequency and weakening all remaining hit data points; and
8) strengthening a change data point of the max energy strength frequency and weakening all remaining change data points if the maximum energy in the current time frame is greater than the last time frame.

73. The audio system of claim 72, the method further comprising:
9) applying a reversed tilt on the frequency domain samples.

74. The audio system of claim 73,
wherein the frequency domain energy bins are denoted as $X[n]=\{x_0[n], x_1[n], \ldots, x_{M-1}[n]\}$, wherein each component $x_i[n]$ is the $i^{th}$ bin of the spectral energy corresponding to spectral content of a signal frame, and where a total of M spectral bins covering the whole spectrum of the signal frame; and
wherein the reversed tilt on the frequency domain energy bins has the form of $x_i[n]=x_i[n]\cdot(Ai+B)$ for $i=0, 1, \ldots M-1$, where A and B are two constants.

75. The audio system of claim 74,
wherein constant A is 9 and constant B is 3.

76. The audio system of claim 74,
wherein the hit set of data points is a hit neural network and the change set of data points is a change neural network.

77. The audio system of claim 74,
wherein the hit neural network is denoted as $F[n]=\{f_0[n], f_1[n], \ldots, f_{M-1}[n]\}$ and the change neural network is denoted as $R[n]=\{r_0[n], r_1[n], \ldots, r_{M-1}[n]\}$, where n is an index of time frame between 1 through I, where I is the number of frames for detection;
wherein each hit neural network node is strengthened and weakened according a hit update formula:

$$f_i[n] = \begin{cases} f_i[n-1] + 1 & \text{for } i = \max \\ f_i[n-1] - 0.1 & \text{for all } i \neq \max. \end{cases}$$

and $f_i[n]$ is hard limited between 0 and a positive constant $I_{total}$ according to $$f_i[n] = \begin{cases} 0 & \text{if } f_i[n] < 0 \\ I_{total} & \text{if } f_i[n] > I_{total} \end{cases}$$

for $0 \leq i \leq M-1$; and
wherein each change neural network node is strengthened and weakened according a change update formula:

$$r_i[n] = \begin{cases} r_i[n-1] + 1 & \text{for } i = \max \\ r_i[n-1] - 0.1 & \text{for all } i \neq \max. \end{cases}$$

and $r_i[n]$ is hard limited between 0 and a positive constant $I_{total}$ according to $$r_i[n] = \begin{cases} 0 & \text{for } r_i[n] < 0 \\ I_{total} & \text{for } r_i[n] > I_{total} \end{cases}$$

only if $x_{max}[n] \geq \alpha[n] x_{max}[n-1]$, where ($\alpha[n]-1$) is a small positive number and $I_{total}$ is an integer not less than $I_t$.

78. The audio system of claim 77,
wherein the hit threshold and the change threshold are $$f_{max}[n] > h_f I_{total}$$

AND $$r_{max}[n] > h_r I_{total},$$

wherein $h_f$ and $h_r$ are two constants.

79. The audio system of claim 78,
wherein $h_f$ and $h_r$ are two constants range from 0.5-0.95; and
wherein ($\alpha[n]-1$) is increasing with n.

80. The audio system of claim 72, further comprising:
9) maintaining an energy neural network for frequency domain energy bins for each time frame signal;
10) strengthening the energy node of the max frequency proportional to the maximum energy and weakening all remaining energy nodes; and
11) adjusting the hit threshold and the change threshold based on the maximum strength of the energy node.

81. The audio system of claim 80, further comprising:
wherein the frequency domain energy bins is denoted as $X[n]=\{x_0[n], x_1[n], \ldots, x_{M-1}[n]\}$, wherein each component $x_i[n]$ is the $i^{th}$ bin of the spectral energy corresponding to spectral content of a signal frame, and wherein a total of M spectral bins covering the whole spectrum of the signal frame; and wherein the reversed tilt on the frequency domain energy bins has the form of $x_i[n]=x_i[n]\cdot(Ai+B)$ for $i=0, 1, \ldots M-1$, where A and B are two constants.

82. The audio system of claim 81,
wherein the maximum energy is $$x_{max}[n] = \max_{0<i<M-1}\{x_i[n]\};$$

wherein the energy neural network is denoted as $G[n]=\{g_0[n], g_1[n], \ldots, g_{M-1}[n]\}$, the hit neural network is denoted as $F[n]=\{f_0[n], f_1[n], \ldots, f_{M-1}[n]\}$ and the change neural network is denoted as $R[n]=\{r_0[n], r_1[n], \ldots, r_{M-1}[n]\}$, where n is an index of time frame between 1 through I, where I is the number of frames for detection;

wherein each energy neural network node is strengthened and weakened according a hit update formula:

$$g_i[n] = \begin{cases} ag_i[n-1]+(1-a)x_{max}[n] & \text{for } i = \max \\ g_i[n-1]-bx_{max}[n] & \text{for all } i \neq \max. \end{cases}$$

and a and b are two adjustable constants;
wherein each hit neural network node is strengthened and weakened according a hit update formula:

$$f_i[n] = \begin{cases} f_i[n-1]+1 & \text{for } i = \max \\ f_i[n-1]-0.1 & \text{for all } i \neq \max. \end{cases}$$

and $f_i[n]$ is hard limited between 0 and a positive constant $I_{total}$ according to $$f_i[n] = \begin{cases} 0 & \text{for } f_i[n] < 0 \\ I_{total} & \text{for } f_i[n] > I_{total} \end{cases}$$

for $0 \leq i \leq M-1$; and
wherein each change neural network node is strengthened and weakened according a change update formula:

$$r_i[n] = \begin{cases} r_i[n-1]+1 & \text{for } i = \max \\ r_i[n-1]-0.1 & \text{for all } i \neq \max. \end{cases}$$

and $r_i[n]$ is hard limited between 0 and a positive constant $I_{total}$ according to $$r_i[n] = \begin{cases} 0 & \text{for } r_i[n] < 0 \\ I_{total} & \text{for } r_i[n] > I_{total} \end{cases}$$

only if $x_{max}[n] \geq \alpha[n]x_{max}[n-1]$, where $(\alpha[n]-1)$ is a small positive number.

83. The audio system of claim 82,
wherein the hit threshold and the change threshold are $$f_{max}[n] > h_f I_{total}$$

AND $$r_{max}[n] > h_r I_{total},$$

wherein $h_f$ and $h_r$ are two constants.

84. The audio system of claim 83,
wherein $h_f$ and $h_r$ are two constants range from 0.5-0.95; and
wherein $(\alpha[n]-1)$ is increasing with n.

85. The audio system of claim 82,
wherein a is between 0.6-0.95 and b is between 0.001 and 0.05.

86. The audio system of claim 82,
wherein $g_i[n]$ is hard limited between 0 and a positive constant $H_{max}$, $$g_i[n] = \begin{cases} 0 & \text{if } g_i[n] < 0 \\ H_{max} & \text{if } g_i[n] > H_{max} \end{cases}.$$

87. The audio system of claim 82, further comprising:
12) determining no singing frequency exists if $g_{max}[n] \leq 0.002$, regardless whether the maximum hit strength exceeds the hit threshold and the strength of the change node with the hit frequency exceeds the change threshold.

88. The audio system of claim 82, further comprising:
12) changing $h_f$ to equal or above 0.9 and $h_r$ to equal or above 0.8 if the max frequency is less than or equal to 500 Hz.

89. The audio system of claim 82, further comprising:
12) changing $h_f$ to equal to or below 0.81 and $h_r$ to equal to or below 0.72 if $g_{max}[n]$ is equal to or greater than 298.

90. The audio system of claim 82, further comprising:
12) changing $h_f$ to 0.64 and $h_r$ to 0.5 if $g_{max}[n]$ is equal to or greater than 1850.

91. The audio system of claim 82, further comprising:
12) setting $f_i[n]$ and $r_i[n]$ to 0 for $0 \leq i \leq M-1$, and setting the energy neural network to $g_i[n]=0.5*g_i[n]$ if a singing frequency is determined.

92. The audio system of claim 82, further comprising:
12) setting $$f_{max}[n] = \left(1.0 - h_f \frac{I_t}{I_{total}}\right) f_{max}[n] \text{ and } r_{max}[n] = \left(1.0 - h_r \frac{I_t}{I_{total}}\right) r_{max}[n]$$

if a singing frequency is not determined.

93. The audio system of claim 72, further comprising:
9) maintaining a second hit neural network and a second change neural network for frequency domain energy bins for each time frame signal;
if a singing frequency is not determined, processing the following steps on the second hit neural network and the second change neural network:
10) weakening the node of the second hit neural network of the max frequency which has the maximum energy to close to zero;

11) weakening the node of the second change neural network of the max frequency which has the maximum energy to close to zero;
12) strengthening the node of the second hit neural network of the second max frequency which has a second maximum energy and weakening all remaining nodes of the second hit neural network;
13) strengthening the node of the second change neural network with the second max frequency which has the second maximum energy and weakening all remaining nodes of the second change neural network if the second maximum energy in the current time frame is greater than the last time frame;
14) locating the node of the second hit neural network with a maximum hit strength and its corresponding hit frequency; and
15) determining a singing frequency is the hit frequency with the maximum hit strength if the maximum hit strength of the second hit network exceeds the hit threshold and the strength of the change node of the second change network with the hit frequency exceeds the change threshold.

* * * * *